April 22, 1958
T. E. LOHR
2,831,363
SCREW ACTUATOR
Filed Oct. 3, 1955
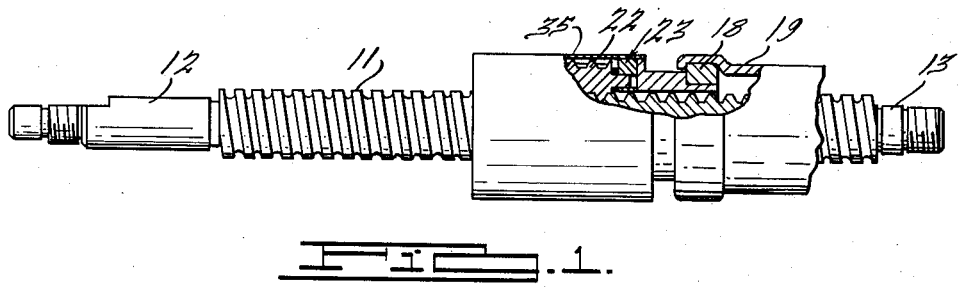
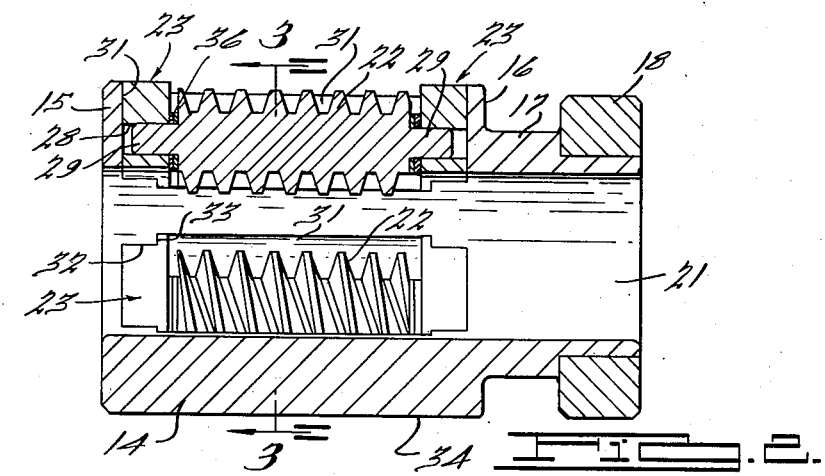
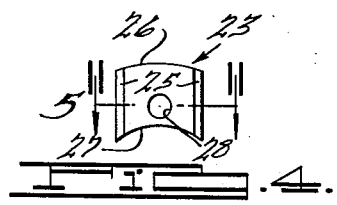
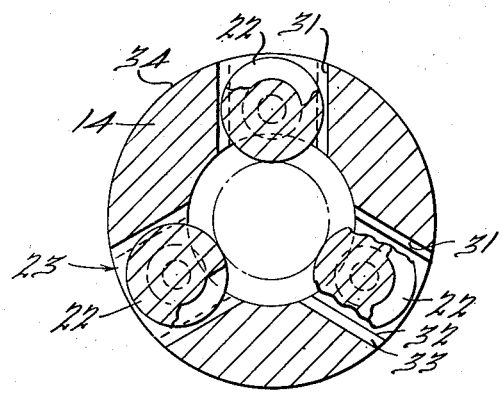
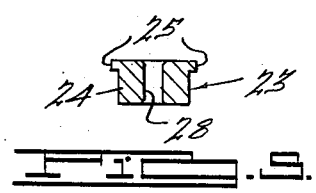
INVENTOR.
Thomas E. Lohr.
BY
Harness, Dickey & Pierce.
ATTORNEYS.

United States Patent Office 2,831,363
Patented Apr. 22, 1958

2,831,363

SCREW ACTUATOR

Thomas E. Lohr, Detroit, Mich., assignor to Hupp Corporation, Detroit, Mich., a corporation of Virginia Application October 3, 1955, Serial No. 538,082

6 Claims. (Cl. 74—424.8)

This invention relates to screw actuators, and particularly to such mechanisms which include a plurality of threaded rollers mounted in an annular cage, these rollers being engageable with the screw and movable axially by rotation thereof.

The use of a nut comprising a plurality of threaded rollers in conjunction with a threaded screw for actuating purposes is well known. In this type of actuator, as exemplified by Buckley Patent No. 511,679, the rollers are carried by a cage which surrounds the screw, being engageable therewith at circumferentially spaced points. Among the disadvantages of previously known constructions of this type is the fact that, in order to assemble the rollers in the cage at the proper distance from the centerline, bearing apertures for the roller shafts must be accurately located. This involves expensive drilling and reaming operations in order to obtain proper tolerances for the parts, and is at best an indirect approach to the goal of assuring that each screw may rotate freely in the roller cage assembly with which it is used.

It is an object of the present invention to eliminate this disadvantage of known constructions of the roller nut screw actuator, and to provide a novel and improved unit which avoids the necessity of drilling or reaming of bearing apertures in the roller cage.

It is another object to provide an improved roller nut screw actuator of this type in which the rollers may be set at the desired distance from the centerline at the time they are assembled into the cage without additional machining operations, and wherein the cage and rollers, once assembled, may be used with any actuator screw manufactured within the specified tolerance range.

Other objects, features, and advantages of the present invention will become apparent from the subsequent description, taken in conjunction with the accompanying drawings.

In the drawings:

Figure 1 is an elevational view, partly in cross section, of the novel roller nut screw actuator of this invention shown in assembled condition;

Figure 2 is a cross-sectional side view of the cage with rollers and bearing blocks mounted therein;

Figure 3 is a cross-sectional view taken along the line 3—3 of Figure 2 showing the relationship of the bearing slots, parts being broken away for clarity;

Figure 4 is an elevational view of one of the bearing blocks; and

Figure 5 is a cross-sectional view of the bearing block taken along the line 5—5 of Figure 4.

The unit comprises a screw actuator 11 having one end 12 adapted to be secured to a prime mover such as an electric motor (not shown), with the other end 13 adapted to be supported by a stationary bearing (also not shown). The thread on screw 11 may be of any desired pitch and shape depending on requirements. Surrounding screw 11 is an annular cage 14. This cage has an end wall 15 at one end thereof and a shoulder 16 adjacent the opposite end. Extending from shoulder 16 is a narrow portion 17 which carries a collar 18 fixed thereto. An actuating sleeve 19 is frictionally mounted on collar 18 and serves to connect cage 14 with the part to be actuated (not shown). It should be understood that other ways of connecting cage 14 to the actuated part could be used within the principles of the invention.

The interior of cage 14 has an axial bore 21 which accommodates screw 11. The connection between cage 14 and screw 11 comprises a plurality of rollers 22 rotatably mounted in the cage. These rollers, which are three in number in the illustrated embodiment, are provided with threads having a pitch and shape corresponding to that on screw 11. The three rollers engage the screw at circumferentially spaced points, and serve to create axial movement of cage 14 when the screw is rotated, in an obvious manner.

The invention includes novel means for mounting rollers 22 in cage 14 so as to obtain consistently accurate tolerances between the rollers and screw without the necessity of expensive drilling and reaming operations in the cage. It will be obvious that in order to obtain efficient operation of a mechanism such as that described, it is essential that the rollers be held at a distance from the centerline which insures proper contact between the rollers and screw. Were one or more of the bearings too close to the centerline, a binding action would take place, whereas with too great a spacing the play would be excessive. Misalignment of the bearings would likewise produce unsatisfactory results in operation. The present invention provides separate bearing blocks or inserts for the roller shafts which are manufactured separately and may be assembled in the cage together with the rollers in such a manner that the setting of the rollers at the proper distance from the centerline may be readily accomplished during this assembly.

The bearing inserts for accomplishing this purpose are generally indicated at 23 and are best seen in Figures 4 and 5. Each insert is identical with the others and comprises a block having a body portion 24 and a pair of flanges 25 on opposite sides of the body. These parts may be fabricated from any suitable material such as powdered metal and may thus be made to close tolerances. One end 26 of each bearing insert is of convex shape with a radius of curvature corresponding to that of the cylindrical cage surface. The opposite end 27 of the bearing insert has a concave shape with a radius of curvature corresponding to that of bore 21 in the cage. An aperture 28 is provided in each bearing insert 23 to accommodate the stub shaft 29 at each end of roller 22.

In order to receive bearing inserts 23 and the rollers which they carry, cage 14 is provided with a plurality of slots 31 as shown in Figure 3. In this figure, the bearing insert in the lower right-hand corner is removed so that the slot is visible. These slots extend from bore 21 radially outwardly to the outer surface of the cage and are of sufficient width to accommodate rollers 22. The slots extend axially from adjacent end surface 15 to adjacent shoulder 16. The opposite ends of each slot are provided with narrowed portions 32 having shoulders 33, the dimensions of portions 32 and the portions of the slot adjacent shoulders 33 being such that bearing inserts 23 may have a press or interference fit therein. The dimensions of inserts 23 are preferably such that when inserted in slots 31 far enough so that their convex surfaces 26 lie flush with the outer surface 34 of cage 14, rollers 22 will be the proper distance from the centerline to accommodate screw 11. A tubular cover 35 is provided for retaining the bearing inserts and protecting rollers 22 from dirt and dust.

In assembling the unit, bearing inserts 23 will first be placed on the opposite ends of rollers 22 so that stub shafts 29 are disposed within apertures 28. Washers 36 may be disposed if desired between the ends of each roller and the bearing inserts for thrust purposes. Cage 14 is next placed over a standard screw 11 having accurately known dimensions, this standard screw being used for assembly purposes. Each assembly of a roller and two bearing inserts is then pressed into a slot 31 of the cage, the three rollers with six bearing inserts being pressed simultaneously toward the centerline. These parts will come to rest when the three rollers 22 operatively engage standard screw 11 with the desired degree of contact. At this time the outer convex surfaces 26 of inserts 23 will be flush with the outer surface 34 of cage 14, and sleeve 35 may then assembled over the outer surface of the cage. Should the convex surfaces of the bearing inserts not be flush with the outer surface of cage 14 when the rollers have proper engagement with the screw, the assembly may be ground or otherwise finished in such a manner that sleeve 35 may be assembled on the cage with the bearing inserts flush with the outer cage surface.

After the assembly is completed, the standard screw is removed and the cage with its rollers is then ready to be mounted on a screw for purposes of operation. The size of the standard screw will of course be such that, once the rollers are assembled using this screw, they are properly spaced for use with any screw manufactured within the prescribed tolerances.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. A roller nut assembly for a screw actuator comprising a cage, a plurality of radial slots in said cage, a plurality of rollers within said slots, and a pair of bearing inserts for each of said rollers, said bearing inserts being press-fitted into the ends of said slots.

2. In a roller nut assembly for a screw actuator, an annular cage, a plurality of slots in said cage extending radially from the inner to the outer surface thereof, a plurality of rollers disposed within said slots, a pair of bearing blocks for the ends of each of said rollers, shoulders at the opposite ends of said slots, and shoulders on said bearing blocks corresponding to said slot shoulders, said bearing blocks having an interference fit with the ends of said slots.

3. The combination according to claim 2, the outer ends of said bearing blocks having a convex shape corresponding to the outer surface of said cage, the inner ends of said bearing blocks having a concave shape corresponding to the inner surface of said cage.

4. A screw actuator comprising a rotatable screw, an annular cage surrounding said screw, a plurality of axially extending slots in said cage extending from the inner to the outer surface thereof, a plurality of rollers disposed within said slots and engageable with said screw, and a pair of bearing inserts for the opposite ends of each of said rollers, each of said pairs of bearing inserts having an interference fit with the ends of one of said slots.

5. A screw actuator comprising a rotatable screw, an annular cage surrounding said screw, a plurality of axially extending slots in said cage extending from the inner to the outer surface thereof, a plurality of rollers disposed within said slots and engageable with said screw, a pair of bearing inserts for the opposite ends of each of said rollers, said bearing inserts having an interference fit with the opposite ends of said slots, and a tubular cover enclosing said cage.

6. In a roller nut screw actuator, a rotatable screw, an annular cage surrounding said screw, means for securing one end of said cage to a device to be actuated, a plurality of slots extending radially from the inner to the outer surface of said cage, each of said slots having a relatively wide central portion and relatively narrow end portions with shoulders therebetween, a plurality of threaded rollers disposed within the wide portions of said slots, a pair of bearing inserts for the opposite ends of each of said rollers, said inserts each having a body portion and side flange portions, said flanges being adjacent said slot shoulders, said bearing inserts having an interference fit with said slots, the outer ends of said bearing inserts being convexly shaped to conform to the curvature of the outer surface of said cage, the inner ends of said bearing inserts being concavely shaped to conform to the inner surface of said cage, and a tubular cover on said cage and enclosing said bearing inserts and rollers.

References Cited in the file of this patent

UNITED STATES PATENTS

| | | |
|---|---|---|
| 511,679 | Buckley | Dec. 26, 1893 |
| 1,943,049 | Weckstein | Jan. 9, 1934 |
| 2,525,326 | Wahlmark | Oct. 10, 1950 |